Feb. 10, 1931.  W. W. VOSPER  1,791,649
PIPE REAMER
Filed Aug. 2, 1928
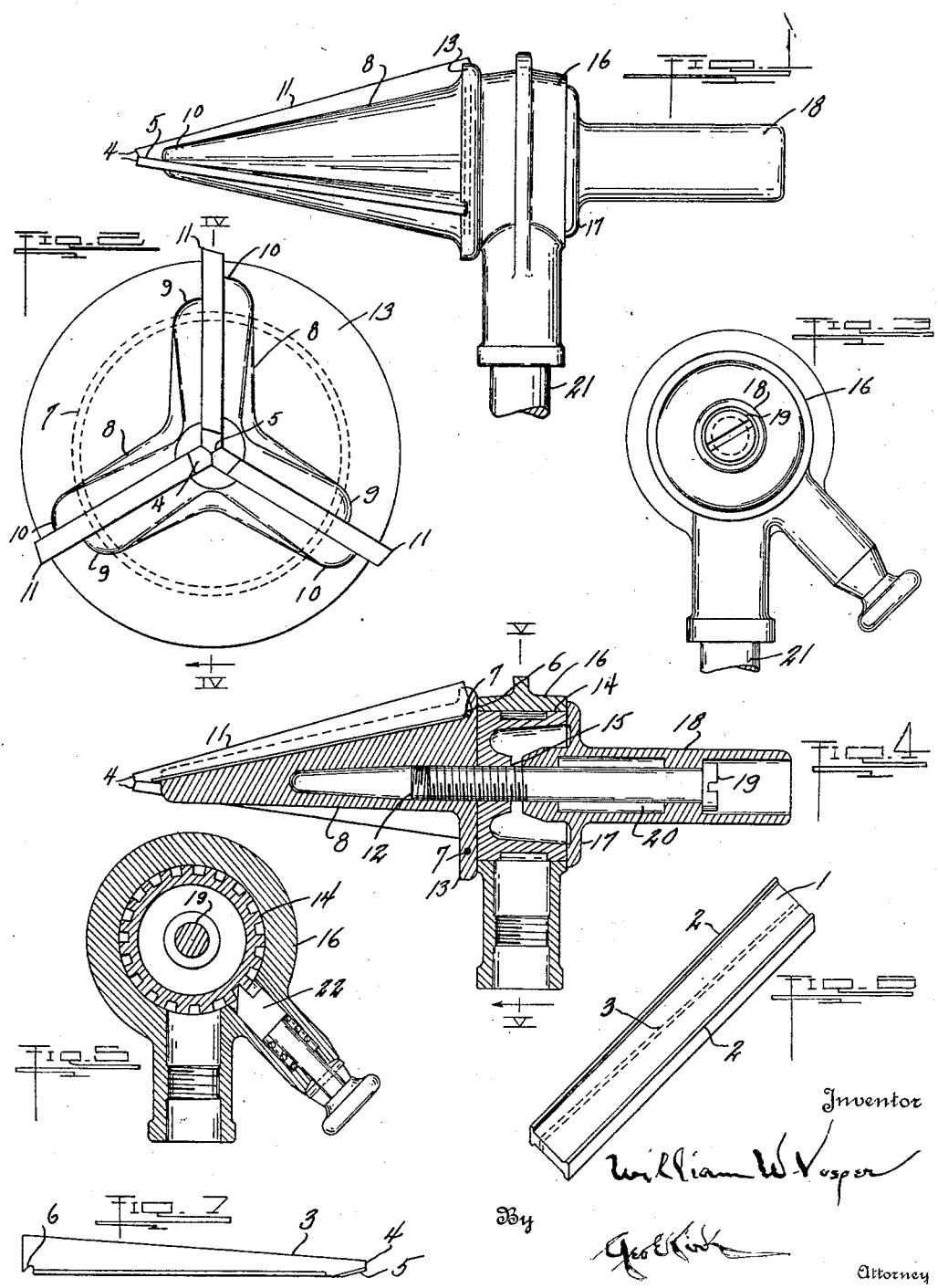

Patented Feb. 10, 1931

1,791,649

UNITED STATES PATENT OFFICE

WILLIAM W. VOSPER, OF TOLEDO, OHIO, ASSIGNOR TO THE TOLEDO PIPE THREADING MACHINE CO., OF TOLEDO, OHIO, A CORPORATION OF OHIO

PIPE REAMER

Application filed August 2, 1928. Serial No. 296,887.

This invention relates to cutting tools.

This invention has utility when incorporated in tapered reamers for removing the bur from tubular pieces, as pipe.

Referring to the drawings:

Fig. 1 is a side elevation of an embodiment of the invention in a pipe reamer;

Fig. 2 is a view looking into the reamer from the left of Fig. 1;

Fig. 3 is a view from the right of Fig. 1;

Fig. 4 is a section on the line IV—IV, Fig. 2;

Fig. 5 is a section on the line V—V, Fig. 4;

Fig. 6 is a perspective view of a blank for a cutting bar; and

Fig. 7 is a view of the cutting bar as produced from the blank of Fig. 6.

Blank 1 with bur or rough edges 2 may be of the desired metal to provide cutting blades. Severing thereof by diagonal cut produces cutting edge line 3. These bars or cutting blades each may have the narrower terminus 4 dressed for interfitting seat portion 5 as the converging region while the diverging major portion is provided with circumferential spacing seat 6. This seat 6 may be engaged by wire ring 7 with the bars nesting at the seat portions 5. As so assembled in a mold and molten metal entering thereabout, the bars are anchored by die casting 8 in providing a support with the bars thus imbedded and anchored. This casting 8 as more readily molten than the bars and has region 9 with greater clearance from the bar edge than opposite region 10 with the edge of the bar on the side 9 being that in the direction in which the reamer is desired to operate and thus provide clearance for the cut out. Portion 10 is a reinforcing backing for the cutting bar. As so assembled in the support, the line 3 is dressed to provide cutting edge 11.

This cutting bar or blade carrying support as an actuator is provided axially with internally threaded seat 12 centrally through larger diameter terminal flange 13. Ratchet 14 having central opening 15 therethrough may have pawl carrier 16 as a lever assembled thereon by slipping over this ratchet with flange 17 of handle 18 assembled therewith by means of bolt 19 through opening 20 in the handle 18 to engage seat 12 in the cutting bar support 8 of the reamer proper.

By oscillating handle 21 of the pawl carrier 16, pawl 22 may be effective in its coaction with the ratchet 14 for giving a clockwise rotation to the reamer for causing the cutting edges 11 to act on the interior of the pipe as directed by the handle 18.

This is a compact substantial assembly of the reamer for effective operation.

What is claimed and it is desired to secure by United States Letters Patent is:

A reamer comprising an annular series of diverging blades terminating in seats, a ring in said seats, and a tool body of dissimilar material partially embedding the blades and fully embedding the ring.

In witness whereof I affix my signature.

WILLIAM W. VOSPER.